July 2, 1963 C. R. FOUTZ 3,096,257
SALT WATER CONVERTING APPARATUS
Filed Nov. 17, 1959 3 Sheets-Sheet 1

INVENTOR.
CLINTON R. FOUTZ
BY
ATTORNEYS

July 2, 1963 C. R. FOUTZ 3,096,257
SALT WATER CONVERTING APPARATUS
Filed Nov. 17, 1959 3 Sheets-Sheet 3

INVENTOR.
CLINTON R. FOUTZ
BY
ATTORNEYS

United States Patent Office 3,096,257
Patented July 2, 1963

3,096,257
SALT WATER CONVERTING APPARATUS
Clinton R. Foutz, St. Petersburg, Fla.; David F. Foutz administrator of said Clinton R. Foutz, deceased, assignor, by mesne assignments, of one-half to Elizabeth Foutz Lundstrom, Buckroe Beach, Va.
Filed Nov. 17, 1959, Ser. No. 853,546
5 Claims. (Cl. 202—205)

This invention relates generally to a method of and an apparatus for creating a change of state of water, and more particularly to an apparatus for converting salt water to fresh water.

In recent years there has been a very great interest in converting salt water, of which the world seemingly has an inexhaustable supply, to fresh water for drinking and irrigation purposes; and for obtaining soluble minerals from this water which is purported to have a great wealth of valuable minerals. The standard and well known system usually used for the distillation of water, as is used on ocean going vessels, for instance, is to effect change of state from liquid to vapor by boiling the salt water by use of heat, for example the boilers on the ocean going vessel, and then condensing the steam formed thereby which is absolutely free of mineral content and sterile. Although this is the standard method for distillation of water, a large amount of heat is necessary to accomplish this.

Accordingly, since some type of fuel must be used the cost of this system is prohibitive when a large quantity of processed water is desired. The great amount of heat required will be further realized when it is considered that at 212° F. it requires about 1000 B.t.u. to vaporize one pound of water. By the use of simple formulas and standard thermodynamics tables, it is found that for every gallon of furnace oil only fifteen gallons of distilled water may be obtained assuming 100% efficiency. Thus, in attempting to obtain hundreds of thousands of gallons of water, which would be necessary for irrigation purposes, the cost of the fuel alone is extremely high.

Furthermore, in the conventional system it is necessary to circulate a coolant through a cooling jacket surrounding the water vapor in order to condense it back into its natural liquid state, and substantially the same number of B.t.u. must be removed to condense the vapor, as was needed to change the water to vapor. This involves the use of power actuated pumps to circulate the coolant, which add an additional cost to the process.

Having in mind the defects of the prior art methods and apparatus, it is the primary object of the present invention to provide an apparatus for converting extremely large quantities of salt water into fresh water at a cost which is practically negligible after the initial investment.

Another object of this invention is to provide a system wherein a vacuum is automatically created in the condenser when condensate flows therethrough; and this vacuum is thus also present in the evaporating tank, which allows greater evaporation at a given temperature or the same evaporation at less than the given temperature because of the lowered pressure, and the quantity of heat per lb. for change of state is less.

A further object of this invention is to provide a change of state distilling system which operates on heat from the ambient air and at ambient air temperature continuously and therefore does not require the application of artificial or man-made heat.

Yet a further object of this invention is to provide an apparatus of the type described wherein the condenser is cooled by ambient air so that no coolant need be artificially induced through the condenser.

Still a further object of this invention is to provide the condensate with sufficient kinetic energy to operate a liquid Pelton Wheel.

An even further object of this invention is to provide a special fitting in the condenser which creates a vacuum therein as the condensate flows therethrough so that the pressure in the evaporating tank may be lowered for more rapid and efficient evaporation of water.

A still further object is to provide heating and evaporating tanks in which the raw water is constantly circulated by natural forces for more efficient heating and evaporation.

The foregoing objects and others ancillary thereto are accomplished according to a preferred embodiment of the invention, wherein at first water evaporation is hastened by the heat of the ambient air, and then continues because of a reduction in absolute pressure in the evaporating tank which lowers the boiling point of water. The vacuum is caused by a special outlet fitting in the condenser which has a vena contracta throat and passages which communicate therewith and with that portion of the condenser where non condensible products are located. Then the system is sealed, at the inlet by the water to be processed, and at the outlet by the water already processed.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

Figure 1:
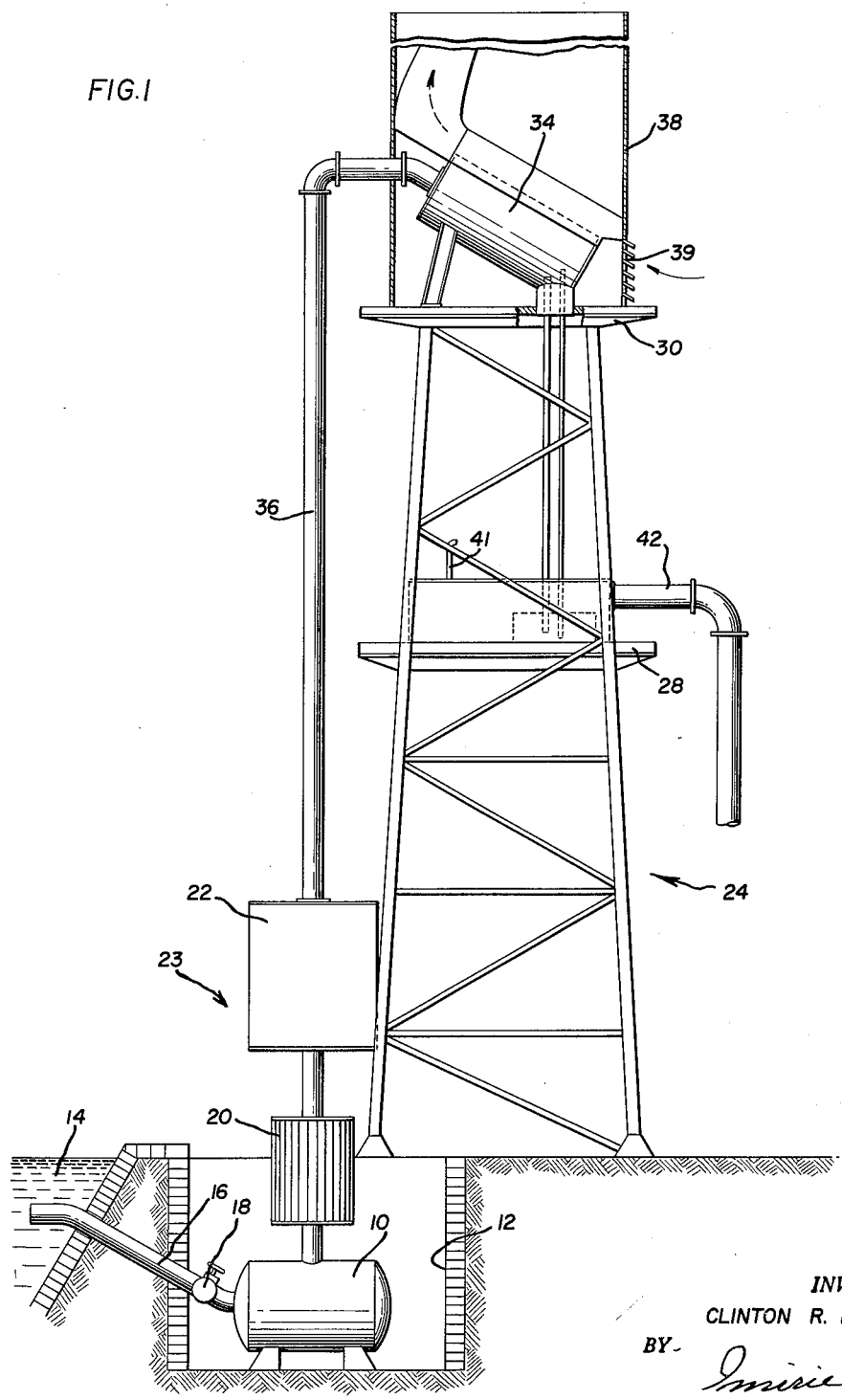
FIG. 1 is a diagrammatic view illustrating the apparatus comprising the present invention.

Referring now more particularly to the drawings, the numeral 10 designates a water storage tank which is disposed within a cavity 12 immediately adjacent and below the level of a source of raw water 14. An inlet pipe 16 is provided between the water source and the storage tank 10 and the water passing through pipe 16 is controlled by valve 18.

Above storage tank 10 at about the level of the water source 14 is a heating tank 20 connected to the storage tank by suitable pipes. A closed evaporating tank 22 is disposed above and communicates with heating tank 20. Storage tank 10, heater 20, and evaporating tank 22, comprise an evaporating unit 23. A plurality of these units may be used to feed vapor to the structure which follows.

Adjacent cavity 12 is a tall tower generally designated as 24 which is of the usual type of skeleton steel construction. The tower 24 has a lower level platform 28, and an upper level platform 30.

Figure 2:
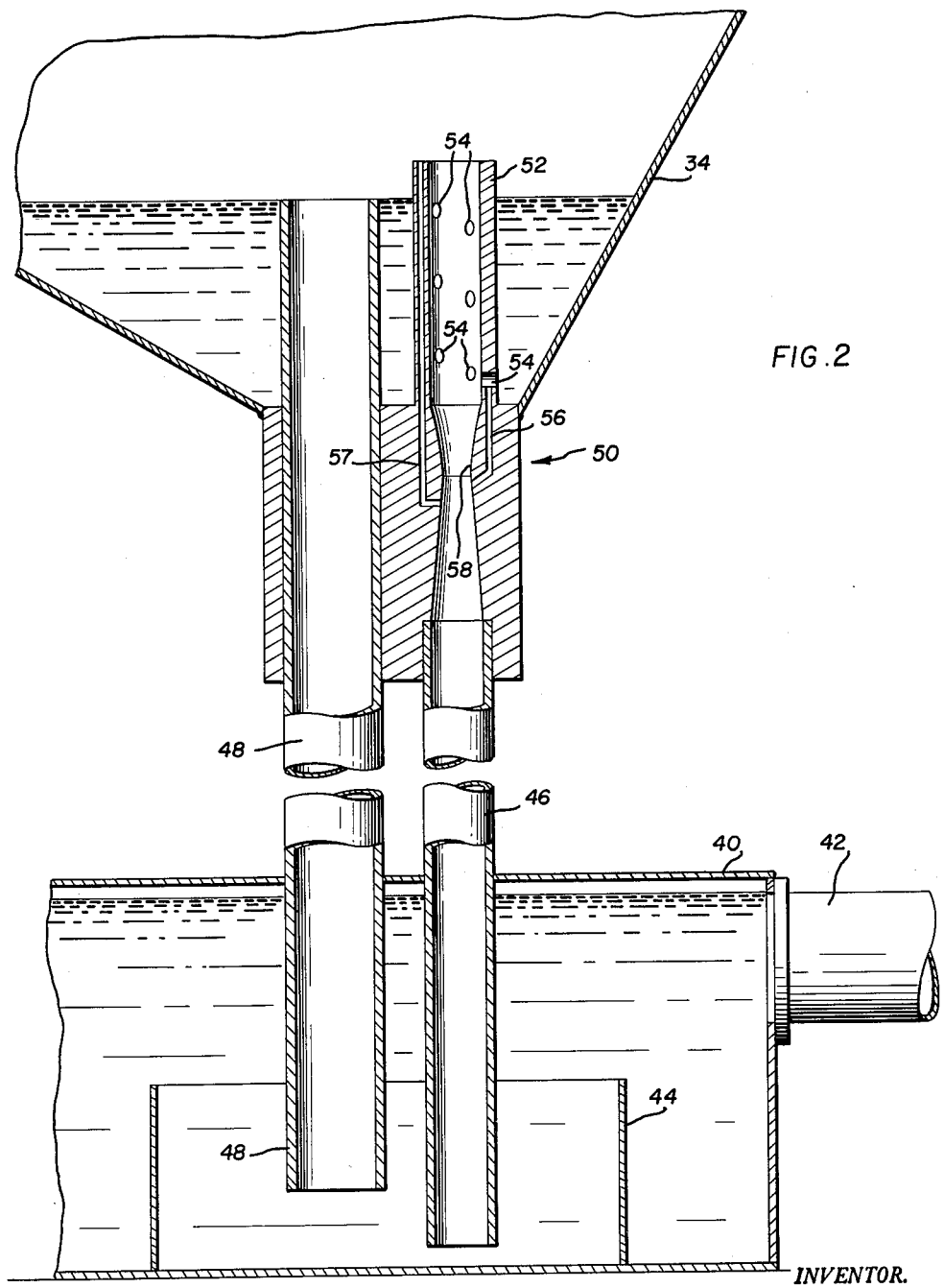
FIG. 2 is a vertical sectional view taken through the vena contracta outlet fitting which provides the necessary vacuum for the system.

A condenser 34, disposed at an acute angle with the horizontal, is mounted on the upper platform 30 and communicates with the evaporating tank by means of conduit 36. A housing 38 open at the top surrounds condenser 34 and is provided with openings 39 on one side for a purpose which will be explained below. On the lower platform 28 is a closed collection tray 40 as may be seen more clearly in FIG. 2, vented by pipe 41 and having an outlet conduit 42 communicating with the upper end thereof and within this tray is a condensate pan 44 which is open at the top. An outlet pipe 46 and an overflow pipe 48 are connected to the lower end of the condenser 34 and are disposed within the condensate pan 44, their lengths being about 78 feet for example, and in any case more than the distance in feet of an atmospheric head of water, i.e. about 34 feet. But, a greater height is needed as a practical matter so the descending water will attain a sufficient velocity to properly operate fitting 50 and create a vacuum. Pan 44 must have sufficient volume to provide enough water so that liquid can be drawn up pipe 48 when a vacuum is created in the condenser. The lower end of pipe 48 is slightly above the lower end of pipe 46 which is spaced just slightly above the bottom of the pan 44.

The outlet fitting 50 is connected to the lower end of condenser 34 and communicates with pipe 46. Within the condenser a pipe 52 projects upwardly from the fitting 50 and the upper end thereof is disposed above the upper end of the overflow pipe 48. A series of vertically spaced orifices 54 which may also be spaced spirally are formed through the lower end of the pipe 52, some of which are provided with air passages 56 communicating with the interior of fitting 50 in the vena contracta throat 58 disposed therein. Other passages 57 are provided and communicate with throat 58 and extend upwardly through the upper end of pipe 52 to communicate with the condenser above the liquid level.

In operation, water from any source, i.e. river or ocean salt water 14, enters pipe 16 under gravitational flow and enters storage tank 10, which is one of a series arranged for the removal of sludges and the collection of valuable soluble chemicals and minerals such as calcium, etc., which are precipitated by concentration of the evaporating water. In the case of ocean water the salt contained therein descends and is collected in the form of crystals.

The water flows from the tanks 10 into an ambient air heater 20 through connecting pipes where the temperature thereof is raised above the temperature of the ocean water.

Evaporation of aqueous vapor takes place at first in heater 20, but after operation for awhile a vacuum pressure is created as explained below, and the ocean water enters the tank 22 at the temperature of heater 20. Tank 22 is provided with suitable and ample means for being heated by ambient air and with very large water evaporating surfaces.

As the temperature of the ocean water increases, the volume of aqueous vapor increases rapidly even at atmospheric pressure which exists in the entire apparatus when starting, since at the same temperature and pressure the vapor is only 0.623 times as heavy as air at the same temperature and pressure. At the beginning of this operation the vapor ascends from heater 20 into tank 22 which is at the same ambient air temperature as that of the heater. The vapor passes up conduit 36 directly into the ambient air cooled condenser 34.

The condenser 34 is placed at a high elevation and is enclosed by a housing 38 to protect it from the direct rays of the sun. The rays of the sun heat the housing causing the air below to flow into openings 39 thereby increasing the velocity of the up-draft air above the condenser and forcing the high altitude and cooler ambient air therethrough. Openings 39 will be situated on the coolest side of the housing e.g., on the north side in the Northern Hemisphere. Thus the air is allowed to pass over the exterior cooling surface of the condenser 34 before exiting at the top of the up-draft flue.

The condenser is essentially at atmospheric pressure and change of state of the aqueous vapor into liquid would necessarily be slow at first because at 14.696 p.s.i. to change each 1 lb. of vapor to liquid condensate requires the removal of 1,036 B.t.u. at 100° F. and this cooling is done by the ambient air. However only a small amount of condensation of vapor in this initial or starting phase will be sufficient to start the second and operative phase which starts quickly with the appearance of the liquid condensate.

The change from the starting phase to the operative phase is as follows. The vapor condenses into liquid as fast as formed and flows into the bottom of the condenser which contains the special outlet-fitting 50 which, in effect, is a liquid-gravitational-actuated vacuum-pump. As the pure water fills this essential component it descends through outlet pipe 46 and falls a distance of about 78 feet (which is the sample height indicated previously) into the small open condensate pan 44. Soon, the outlet end of the pipe 46 and the outlet end of the overflow pipe 48 are submerged in water. The upper end of pipe 48 enters the condenser's bottom close to the fitting 50 (but with its inlet higher or above the orifices 54). Soon the condensed liquid water level in condensate pan 44 rises and closes the outlets of both pipes 46 and 48 with respect to the atmosphere.

The entire processing system at inlet and outlet pipe ends is sealed by raw-water and pure processed water, respectively, with the atmospheric absolute pressure being, the same at inlet or outlet. The water level in pan 44 rises and quickly seals the lower end of pipe 46 but no vacuum is created at first since the water level has not sealed pipe 48 and air is drawn therethrough and into the condenser. It is only when both pipes are water sealed that a vacuum is maintained in the system and as the vacuum increases water is drawn up pipe 48. After submergence of the outlet ends of the pipes the condensed liquid completely fills pipe 46 through its 78 feet length because of the condensate from the condenser running through the pipe. At first its descending velocity is $$V = C\sqrt{2\ gh}.$$

where C=the coefficient of velocity (taken as 1 for a theoretical value) and V is over 70 feet per second. The pipe 46 is filled completely with liquid and at the high velocity of descent the gases or fluids within the system are withdrawn from the condenser through passages 56 and 57 and orifices 54 extending over the length of pipe 52. The special outlet fitting 50 accomplishes this by its construction which lowers the pressure at the throat 58 and the non-condensible products are withdrawn with the high velocity descending stream and are discharged with the condensate into the condensate pan 44.

The pan 44 is made small in volume in order to fill with condensate quickly and then seal the pipe outlets so the pressure-drop or vacuum vaporization may start quickly. This pan is placed in a large volume collecting tank 40 which is closed, but is vented at its top at 41. Tank 40 is elevated above the raw-water inlet's water-level on a platform of the tower 24, and from this tank the pure water may, under gravitational force flow a long distance into storage tanks or to a lake by direct descent, or have its foot-pounds of force converted into mechanical energy without detriment to water purity by use of a Pelton Wheel at the lower end of conduit 42. The water may be stored for drinking purposes or used for agricultural irrigation. Since the aqueous vapor has been vaporized at such very low absolute pressure and temperature this water cannot be considered absolutely sterile in that there has not been a sufficient heating to destroy the bacteria which are harmless to man but essential to plant life and growth.

Until the outlets of both pipes 46 and 48 are covered to a sufficient depth in the tank with condensate the apparatus is still in its initial or starting up period of operation. Now when all outlets are liquid sealed at the prevailing atmospheric pressure, the aqueous-vapor as fast as initially condensed into its liquid state flows directly into the special fitting 50 filling it and its down flow tube for its entire length. The gas in the condenser is removed and, since the system is water sealed, the gas in the system expands and becomes less dense and thus rises toward the condenser and may be rapidly withdrawn by the rapidly flowing liquid completely filling the pipe 46 which is liquid-atmospheric pressure sealed. As the volume of the liquid condensate increases under the hydrostatic head the velocity of flow reduces the pressure along the vena contracta orifices and the contained non-condensible gases which would float on the surface of the liquid condensate are drawn in. They flow in because of the position of the inlet gas orifices and the absolute pressure becomes low and remains that way at all times during the processing operation.

Because of the very great pressure drop created at the vena contracta inlets 54 which are always at the lowest pressure of the entire system the gases flow in and through the passages 56 and 57 and out at the openings in the throat 58. These openings are the non-condensible gas outlets and are the places outside the condenser at which the absolute pressure is and always will be the lowest (highest vacuum) during any type, fast or slow operation, which is created by the natural surrounding operation of the locality selected for the salt-water conversion for drinking water and for irrigation purposes.

As the air is withdrawn i.e. forced out by the difference in pressure, from the condenser and ejected into the pipe 46 with the descending liquid condensate into pan 44, the steadily increasing pressure-drop (increasing vacuum) in the condenser and entire system causes the condensate in pipes 46 and 48 to be forced up in them because the atmospheric pressure on their outlets is greater. This also effects the raw-water inlet which pushes the salt-water up through the tank 10, heater 20 into the larger surfaced water evaporating tank 22, where the higher the vacuum the lower the absolute pressure above the surface and the more rapid the evaporation and the smaller the quantity of heat required to effect the change of state from liquid into aqueous vapor.

As the system contained air and the water-soluble gases are withdrawn from the condenser the vacuum increases. As this absolute pressure steadily decreases the raw-water (inlet water fresh or salt) to be vaporized rises into the large surfaced evaporating tank 22 to a water level corresponding to the vacuum maintained therein and at the same time the same liquid head, in feet will decrease from the design head of 78 feet, to 78 minus the vacuum pressure in the condenser expressed in feet of water.

Because as the raw-water enters the apparatus from the sea, river, or other sources it contains a large volume of soluble gases ($O_2$ 38 percent by volume in the tropical regions), and at 68° amounts to a volume of 1.054 cu. ft. per cu. ft. of water at 62.23 lbs. per cu. ft., this soluble gas will expand and emerge under the reduced surface pressure in tank 22 ascending with the aqueous vapor and entering the condenser only to be withdrawn and flow into the pan 44. However, as the evaporation at the surface in tank 22 will be very rapid, raw-water will be entering continuously in a steady flow and this will amount to 0.017 cu. ft. of gases per 1.00 lb. of water evaporated. A time will come when the vacuum attained within the condenser and entire system will reach a state of equilibrium which is affected by the ambient air temperature and the other variables incident to the particular country and locality conditions effecting the evaporative procedure.

When the pressure in tank 22 is lowered to about 0.949 p.s.i. absolute, the aqueous vapor evaporation could become so rapid in pounds/second that the volume of non-condensible gas entering in the raw-water could not all be ejected fast enough. In this case the vacuum would become less until a pressure drop was reached such that the rate of evaporation in lbs. per second would be determined by the absolute pressure that could be maintained by the liquid vacuum pump fitting 50. But these are simple design problems easily solved when all the local conditions that would affect the sea-water conversion into fresh water are known.

When the evaporation is more rapid, due more to the pressure drop than due to the rise in water temperature from the actual quantity of heat in B.t.u. received in the heater 20, the effect will tend to "cool," lower the water temperature in evaporating tank 22. This raw-water temperature decreases above the heater 20 and would decrease the rate of evaporation which in turn would decrease in time the quantity of raw-water flowing in from the sea.

When the absolute pressure in the condenser and evaporating tank remains constant, the evaporation will be at a rate in pounds corresponding to the rate at which the quantity of heat is received from the raw-water heater to cause the change of state, liquid into vapor.

Figure 3:
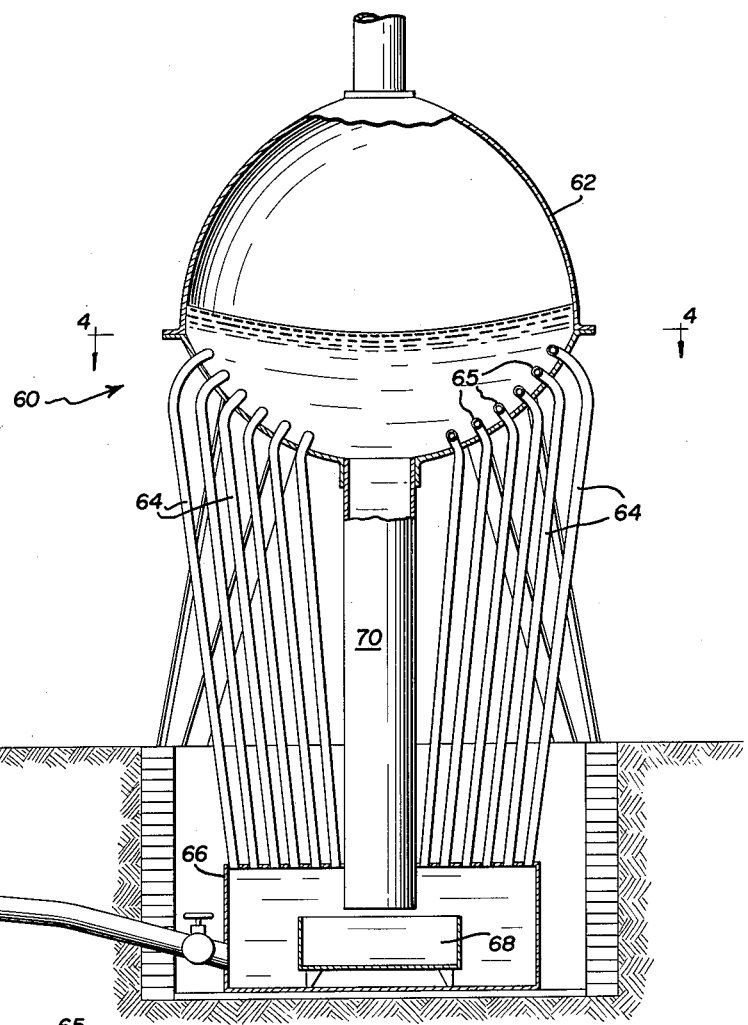
FIG. 3 is a vertical sectional view, partly in elevation, of a modification of the heating and evaporating tanks.

Although any convenient type of heating tank 20 may be used, FIG. 3 discloses a particular type of heating tank which is particularly useful in the present system and which combines an evaporating tank therewith. The combined heating and evaporating tank is generally designated as 60 having a spherical evaporating tank 62 at the upper end thereof and heating tubes 64 arranged in circles of varying size and communicating with tank 62. A reservoir tank 66 communicates with the lower ends of heating tubes 64 and is the last in the line of storage tanks 10 which remove sludge and dirt from the incoming salt water in the conventional manner. A smaller collection tank 68 is disposed in tank 66 and is open at the top. A downflow tube 70 is located just above the collection tank 68 and at its upper end communicates with the lower portion of evaporating tank 62.

The operation of the entire system is identical to that disclosed above but when the raw-water enters tank 66 it will at first rise in tubes 64 to the same level as a water source. Heat from the ambient air will cause some evaporation of water and the vapor will flow upwardly through tank 62 and into the condenser to begin the operation as has previously been disclosed.

As the vacuum in this system becomes greater the water in tubes 64 rises and the water level eventually reaches a position at about the medial portion of spherical tank 62 and at this position the system reaches equilibrium so that a large surface area of the water is available for evaporating.

Figure 4:
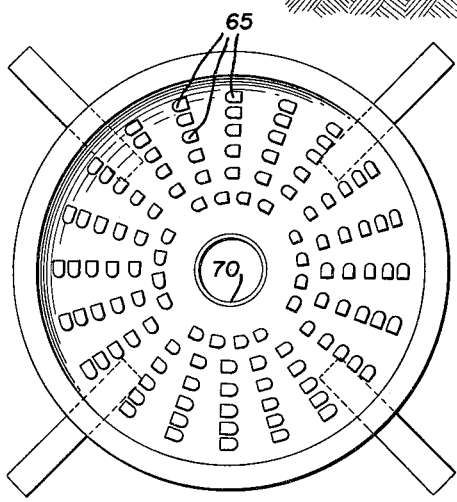
FIG. 4 is a horizontal sectional view of the evaporating tank taken substantially along the plane defined by reference line 4—4 of FIG. 3.

The heated water moves upwardly in tubes 64 and, as indicated in FIGS. 3 and 4, passes through nozzles 65 which direct the water in a horizontal direction into a path which is tangential to the circles defined by the tubes 64. As this heated water enters tank 62, evaporation takes place which causes some cooling of the water. This relatively cool water flows toward the bottom and lower end of spherical tank 62 and descends through tube 70 toward collection tank 68. The water flowing downwardly toward and through tube 70 is extremely high in mineral content because at this point the same amount of minerals is contained in a smaller amount of water due to evaporation and some of these minerals precipitate out of solution and into tank 68. The water is then circulated through heating tubes 64 so that there is more efficient heating of the water.

The water passing through nozzles 65 increases the velocity of the water somewhat in tank 62 which causes the water at the outer portion of the tank to rise up as indicated in FIG. 3. This movement not only increases the evaporating surface area, but also creates a whirlpool which forces the water down tube 70 for more rapid recirculation and thus greater heating efficiency. The nozzles 65 direct the water for formation of a whirlpool which follows the direction of the natural whirlpool forces depending upon which portion of the earth this structure is disposed.

The purpose of this invention is the dual change of state: from water to vapor and back to liquid again from vapor under the conditions created by nature where this physical change is effected at absolute pressure so low that in each conversion the heat added and regained to vaporize and liquify, that is, the B.t.u. added, and the B.t.u. required to cool the aqueous vapor into liquid, are at a minimum. And further under the conditions provided by nature in many countries of the world this conversion will be carried on by the apparatus described receiving and using automatically the energy from the ambient air which functions continuously without heat, energy, or power supplied by man or outside source.

This apparatus functions without direct use of solar rays. However, heat supplied indirectly effecting the ambient air temperature on the earth's surface or associated parts increases the rate of effecting the change of state in both cases.

Theoretically the tower must be at least 34 ft. so as to be capable of handling a perfect vacuum. Pipe 48 should also be at least 34 ft. for the same reason and these are substantially the lower limits of tower height. Also, evaporation tank 22 must be of sufficient height to compensate for tides (if any), changes in local atmospheric pressure, and changes in the vacuum of the system. As a practical matter, pipe 48 must be much more than 34 ft. in length since the vacuum pressure developed will depend on the velocity of the falling water which depends upon the height of the fall.

Although the present invention is primarily designed to be operated by natural forces, it may be operated in addition by some artificially applied forces such as heaters for the evaporating means and blowers for the condenser. In such a case a great increase in the efficiency of operation over conventional systems will be available since but a small quantity of heat will vaporize a large amount of water.

Although certain specific embodiments of the invention have been shown and described, it is obvious that many modifications thereof are possible insofar as is necessitated by the prior art and by the spirit of the appended claims.

What is claimed as new is:

1. An apparatus according to claim 3 wherein said discharge duct comprises an outlet fitting for withdrawing gases from the condenser upon fluid flow therethrough, said fitting comprising an elongate tube having a vena contracta throat therein, a plurality of openings formed through said tube above the throat and disposed at different distances therefrom to adapt the fitting for use through a range of fluid levels in the condenser, passages forming said inlet means in the wall of the fitting in communication with the bore of the tube at a position in the downstream portion of said throat and with the upper end of the tube above the level of the condensate to remove gases from the condenser by aspiration.

2. Apparatus for distilling liquid according to claim 3 wherein said evaporator comprises a reservoir tank, a generally spherical evaporating tank supported above and spaced from said reservoir tank, a plurality of ambient air heating tubes in communication with said reservoir tank and said evaporating tank through which a liquid may move upwardly when heated, a recirculating tube in communication with the reservoir tank and the lower end of the evaporating tank for directing cooler liquid in the evaporating tank to the reservoir tank for further travel through said heating tubes, said heating tubes being arranged in various sized circles and the upper ends thereof defining nozzles for directing heated liquid in a horizontal plane at a tangent to the circle in which the particular tube is disposed and in a direction to aid the formation of a natural whirlpool so that a larger liquid evaporating surface is provided and cooler liquid is recirculated more quickly by said whirlpool forcing such liquid downwardly through the recirculating tube.

3. An apparatus for distilling liquid in a closed vacuum system sealed at one end by the liquid and at the other end by the condensate, comprising gravity operated means for leading the liquid from a source in the open to at least one evaporator also situated in the open and adapted to be heated by ambient thermal conditions, an ambient air cooled condenser disposed above the evaporator at a height exceeding the height of a barometric column of the liquid at atmospheric pressure, a vapor conducting duct connecting the evaporator to the condenser, a condensate receiving tank open to the atmosphere and positioned below the condenser a distance exceeding the height of a barometric column of the condensate, and a condensate discharge duct leading from the lowest part of said condenser to a point spaced above the bottom of the condensate receiving tank, said condensate discharge duct having venturi means in its inlet end including a duct extending into the condenser to a level above said lowest part for sucking air and vapor from the condenser above the level of the condensate therein by movement of the condensate through said means.

4. An apparatus according to claim 3, wherein said venturi means for producing a vacuum in the condenser comprises a restricted vena contracta throat in said discharge duct, and a plurality of passages in the wall of the discharge duct leading from above the condensate level in the condenser to the bore of said discharge duct at points immediately below said throat whereby gases are withdrawn from the condenser by aspiration.

5. An apparatus according to claim 3, wherein is additionally provided an overflow duct leading from the condenser to said condensate receiving tank, said overflow duct extending from slightly above the level of the inlet end of the said discharge duct to slightly above the level of the outlet end of the discharge duct whereby the overflow duct is adapted to be sealed by the condensate at its lower end and to lift condensate from the receiving tank toward the condenser to vacuum seal the latter.

References Cited in the file of this patent

UNITED STATES PATENTS

| | | |
|---|---|---|
| 127,197 | Simpson | May 28, 1872 |
| 138,375 | Brown | Apr. 29, 1873 |
| 167,642 | Bulkley | Sept. 14, 1875 |
| 825,719 | Gutermuth | July 10, 1906 |
| 1,544,029 | Nelson | June 30, 1925 |
| 1,558,957 | White | Oct. 27, 1925 |
| 1,611,059 | Nicolai | Dec. 14, 1926 |
| 1,777,817 | Whittington | Oct. 7, 1930 |
| 1,966,938 | Stone | July 17, 1934 |
| 1,991,720 | Barreda et al. | Feb. 19, 1935 |
| 2,006,985 | Claude et al. | July 2, 1935 |
| 2,013,236 | Dell | Sept. 3, 1935 |
| 2,094,568 | Dell | Sept. 28, 1937 |
| 2,272,451 | Weir | Feb. 10, 1942 |
| 2,357,829 | Ittner | Sept. 12, 1944 |
| 2,361,411 | Murphy | Oct. 31, 1944 |
| 2,490,659 | Snyder | Dec. 6, 1949 |
| 2,590,905 | Tomlinson et al. | Apr. 1, 1952 |
| 2,647,862 | Whitney | Aug. 4, 1953 |
| 2,727,855 | Goldsbarry | Dec. 20, 1955 |
| 2,755,745 | Lewis | July 24, 1956 |
| 2,842,485 | Zellner | July 8, 1958 |
| 2,994,647 | Williamson et al. | Aug. 1, 1961 |

FOREIGN PATENTS

| | | |
|---|---|---|
| 160,907 | Germany | Mar. 23, 1918 |

OTHER REFERENCES

Badger & McCabe, "Elements of Chem. Eng.", 2nd ed. McGraw-Hill Book Co., Inc., N.Y.C.